(12) United States Patent
Aragones et al.

(10) Patent No.: US 7,692,126 B2
(45) Date of Patent: Apr. 6, 2010

(54) DEVICE FOR COUNTERING AND TRACKING A THREAT WITH OPTICAL DELAY DEVICE

(75) Inventors: Julien Aragones, Antony (FR); Jacques Robineau, La Ville du Bois (FR)

(73) Assignee: Sagem Defense Securite, Paris (FR)

( * ) Notice: Subject to any disclaimer, the term of this patent is extended or adjusted under 35 U.S.C. 154(b) by 135 days.

(21) Appl. No.: 11/885,087

(22) PCT Filed: Feb. 23, 2006

(86) PCT No.: PCT/EP2006/060201

§ 371 (c)(1),
(2), (4) Date: Aug. 22, 2007

(87) PCT Pub. No.: WO2006/089923

PCT Pub. Date: Aug. 31, 2006

(65) Prior Publication Data

US 2009/0121072 A1 May 14, 2009

(30) Foreign Application Priority Data

Feb. 23, 2006 (FR) .................................. 05 01834

(51) Int. Cl.
*G01S 7/00* (2006.01)
*G01S 7/48* (2006.01)
*F41G 9/00* (2006.01)
*F42B 15/00* (2006.01)

(52) U.S. Cl. ............................. 244/3.1; 342/13; 89/1.11
(58) Field of Classification Search ............... 342/1–20, 342/175; 244/3.1–3.3; 455/1; 89/1.11
See application file for complete search history.

(56) References Cited

U.S. PATENT DOCUMENTS

| | | | | |
|---|---|---|---|---|
| 3,710,256 A | * | 1/1973 | Lewis | 455/1 |
| 3,956,729 A | * | 5/1976 | Epstein et al. | 342/15 |
| 4,164,741 A | * | 8/1979 | Schmidt | 342/15 |
| 4,328,496 A | * | 5/1982 | White | 342/15 |
| 4,393,382 A | * | 7/1983 | Jones | 342/13 |
| 4,808,999 A | * | 2/1989 | Toman | 342/15 |
| 5,136,295 A | * | 8/1992 | Bull et al. | 342/15 |
| 5,206,502 A | | 4/1993 | Gardner | |
| 5,786,786 A | * | 7/1998 | Small | 342/13 |
| 5,793,477 A | * | 8/1998 | Laakmann | 342/14 |
| 6,384,765 B1 | * | 5/2002 | Sjostrand et al. | 342/15 |

(Continued)

FOREIGN PATENT DOCUMENTS

FR 2535467 5/1984

(Continued)

*Primary Examiner*—Bernarr E Gregory
(74) *Attorney, Agent, or Firm*—Blakely, Sokoloff, Taylor & Zafman

(57) ABSTRACT

The invention concerns a device for countering and tracking a threat with optical delay device in the form of a homing-head missile, comprising a homing head adapted to receive an incident coherent light beam and in deflecting same to produce a transmitted beam. The invention is characterized in that the homing head comprises a biprism dividing the transmitted beam into two sub-beams, the biprism being associated with an optical delay device introducing an optical path difference between the two sub-beams greater than the coherence length of the incident beam.

12 Claims, 3 Drawing Sheets

U.S. PATENT DOCUMENTS

| | | |
|---|---|---|
| 6,410,897 B1 | 6/2002 | O'Neill |
| 6,542,109 B2 * | 4/2003 | Lloyd et al. ................ 342/14 |
| 6,633,251 B1 * | 10/2003 | Huggett ...................... 342/14 |
| 6,903,674 B2 * | 6/2005 | Hoesel et al. ................ 342/13 |
| 7,378,626 B2 * | 5/2008 | Fetterly ...................... 244/3.1 |
| 7,400,287 B2 * | 7/2008 | Saccomanno ................ 342/12 |
| 2002/0145554 A1 * | 10/2002 | Lloyd et al. ................ 342/13 |
| 2004/0257262 A1 * | 12/2004 | Hoesel et al. ................ 342/13 |

FOREIGN PATENT DOCUMENTS

FR 2821929 9/2002

* cited by examiner

FIG. 1
PRIOR ART
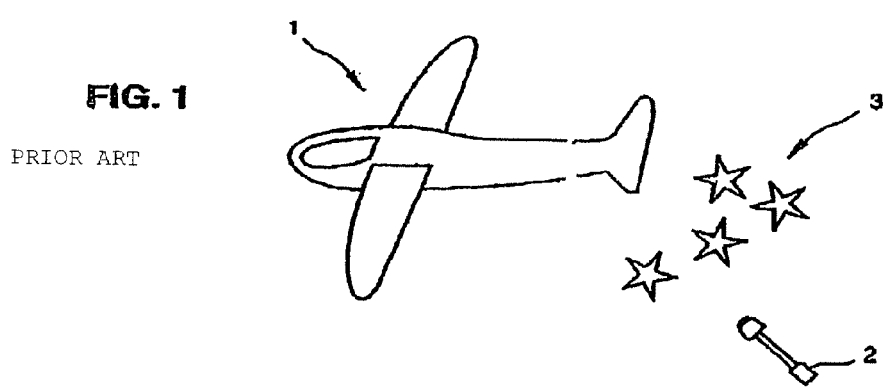
FIG. 2
PRIOR ART
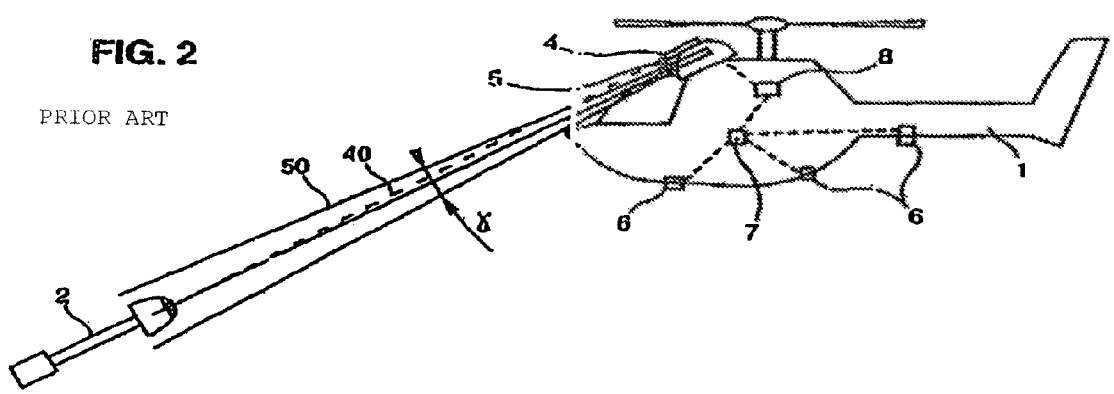
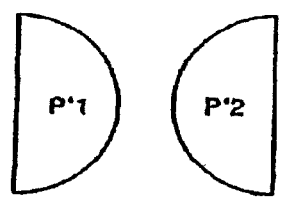
FIG. 5C
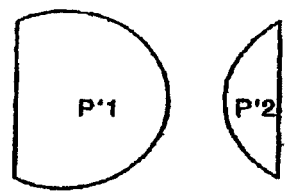
FIG. 5D

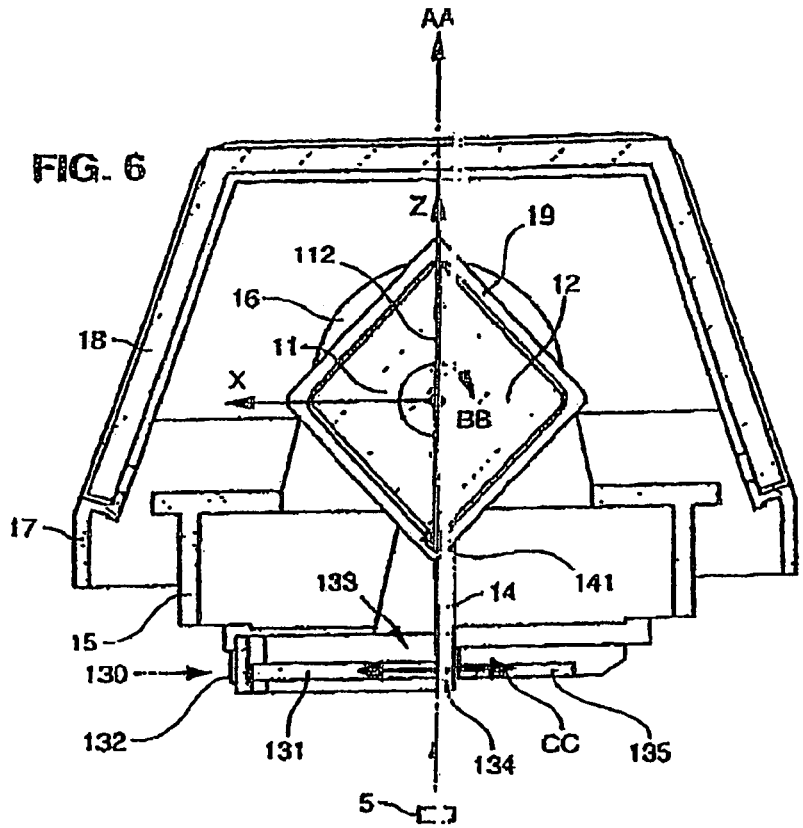
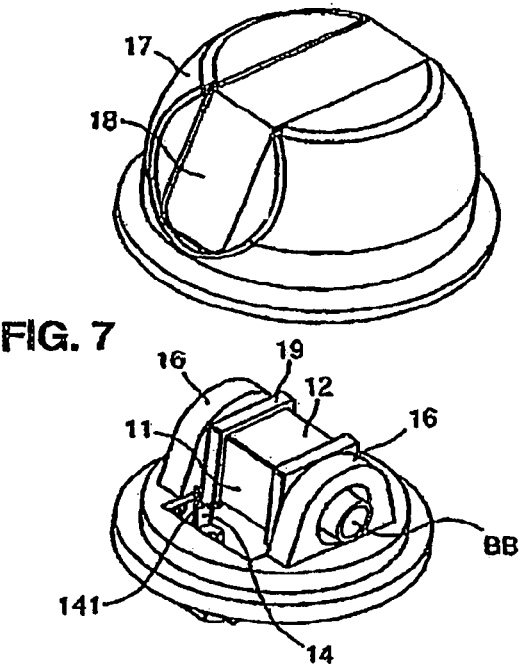

DEVICE FOR COUNTERING AND TRACKING A THREAT WITH OPTICAL DELAY DEVICE

The present patent application is a non-provisional application of International Application No. PCT/EP2006/060201, filed Feb. 23, 2006.

TECHNICAL FIELD

This present invention concerns an improved device for tracking a threat and deploying directed counter-measures.

More precisely, it concerns a device for tracking and countering a threat in the form of a homing infrared missile (ADIR).

BACKGROUND

FIG. 1 schematically represents a known pyrotechnic countermeasure device 3 protecting an aircraft 1, for example, from a threat 2. The threat 2 comes in the form of an infrared homing missile (ADIR).

Device 3 is a pyrotechnic decoy that generates infrared rays when it is fired out of the aircraft 1, when the latter has detected a threat. The infrared rays generated by the decoy 3, which are more intense than the infrared rays generated by the aircraft 1, cause a deviation in the trajectory of the threat. The threat homes in on the decoy 3 rather than on the aircraft 1.

However, these pyrotechnic decoy devices have a number of drawbacks.

To begin with, they are difficult and expensive to design. In addition, they represent a fire risk inside the aircraft if they malfunction. Furthermore, in the event of a false alarm, they seriously compromise the stealth aspect of the aircraft 1. Finally, they are consumable devices that have to be replaced regularly, and are highly specialized to one particular type of threat.

As a consequence, current countermeasure devices are generally of the infrared illumination jammer type.

FIG. 2 schematically represents a known Directional infrared Counter-Measure device (DIRCM).

The aircraft 1 thus includes a missile departure detection device (or Missile Warning System—MWS) in the form of a multiplicity of detectors 6 mounted on the fuselage of the aircraft 1. The detectors 6 detect the launch of a missile 2, track the missile trajectory and identify it as a threat to the aircraft 1.

A device 7 for monitoring the launch detection device transmits the missile trajectory 2 to the control device 8 of a directional countermeasure system.

The control system 8 then triggers the tracking device 4 which tracks the missile and determines its direction in space. The tracking device 4 detects the missile homing system 2 by its laser equivalent surface or "LES", which is the quantitative value of the "cat's eye" effect. To this end, the tracking device 4 emits a tracking light beam 40 in the direction of the missile homing system 2 and measures the reflected echo in order to measure the LES of the "seek head".

The control device 8 also controls a jamming light beam 50 that has an angular opening (γ) produced by an infrared light source 5. The light source 5 generally uses discharge-type infrared lamps, whose spectrum covers a broad spectrum of wavelengths, from the visible up to the far infrared. Once tracking has locked on correctly and the missile is securely within the beam of the light source 5, the infrared illumination 5 is transmitted toward the missile homing system 2 in a specific sequence in order to cause jamming of the missile 2, so that it no longer represents a threat to the aircraft 1.

These discharge light sources 5 also have many drawbacks however.

Due to the coverage required from the light source, beam concentration requires a voluminous optical device (large aperture, long focal length, etc.) which is very bulky and heavy. The jammers based on discharge lamps are therefore difficult to accommodate on board aircraft. In addition, the illumination power available is rather limited, thus greatly limiting the effectiveness of such jammers using discharge lamps.

Thus, with the evolution of the technology, it is now possible to create infrared laser sources that emit wavelengths of between 3 and 5 micrometers. This evolution of the technology allows us to achieve a significant improvement in tracking and countermeasure devices. In fact, with a laser source, it is possible to considerably increase the beam strength 50 and/or 40 with a far smaller source than the discharge type, and much closer to the diffraction limit. Because the laser source is a coherent source, all the beam energy is concentrated in a single wavelength.

Increasing the beam strength over one or more specified wavelengths has certain advantages.

A laser beam allows us to deposit a higher light level than that of the discharge lamps at the aperture entry of the homing device of the threat.

The laser energy can be contained in several rays (typically two or three) so as to be able to effectively illuminate all types of missile homing device.

Because of its high brightness (the beam is close to diffraction) a laser beam can be collimated with an optical device of small dimensions, rendering the latter easy to fit into aircraft while also providing a range of performance that is acceptable for the required functions of active tracking, of identification AD and jamming DIRCM.

A laser beam can be reflected to a greater extent by the "seek head", so that missile identification 2—in particular by the modulation that it imparts to the reflected laser beam—is facilitated. A quality identification of the threat 2 allows us to transmit an effective jamming code, meaning a code that is truly designed for the missile type 2. The source is very directional, thus enhancing the general stealth aspect of the aircraft.

However, tracking and countermeasure devices using a laser source present a number of drawbacks.

Because of the narrowness of the laser beam produced by the laser source (in general less than 1 milliradian), the tracking device 4 must be capable of very precise tracking of the missile infrared detector 2.

In addition, the coherence characteristic of the laser sources imposes the use of a beam shaping, orientation and stabilization device which generates no interference that could have negative consequences for general system operation and particularly on the effective jamming of the missile homing system.

It is therefore very difficult to design a tracking and countermeasure device that can rapidly and simply track the missile where an infrared laser source is used.

SUMMARY OF THE INVENTION

The invention proposes to overcome at least one of these drawbacks.

To this end, the invention proposes a device to counter and track a threat in the form of a missile with an infrared homing device, including a homing head designed to receive an incident coherent light beam and to re-direct the latter in order to produce a transmitted beam, characterized in that the homing head includes a double prism that divides the transmitted beam in two sub-beams, with the double prism being associated with an optical delay device that introduces an optical path difference between the two sub-beams that is greater than the coherence length of the incident beam.

The invention is advantageously completed by the following characteristics, taken alone or in any of their technically possible combinations:

- the double prism is mounted to rotate in elevation around an axis perpendicular to its base and passing through its geometric center;
- the head is mounted to rotate in horizontal bearing around an axis parallel to the base of the double prism and passing through the geometric center of the double prism;
- the delay device includes an optical blade;
- the blade is mounted on a mobile support, on a slide, with the device including movement resources that are designed to move the support of the blade on the slide as a function of a angular position of the double prism;
- the movement resources include a bracket connected firstly to a link to a support of the double prism and secondly to a link to the support of the blade;
- the movement resources include a drive motor for the blade support on the slide;
- the blade is inclined on its support;
- the blade and the movement resources are statically balanced so as to avoid angular destabilization of the sighting line during the tracking phases by linear excitation of the beam homing head;
- the double prism is mounted on a mobile support to rotate around the elevation rotation axis in a yoke;
- a protective cover for the double prism is mounted to rotate in horizontal bearing;
- the device includes an infrared laser source with a coherence length of the order of magnitude of one centimeter.

The invention has many advantages.

The tracking 4 and countermeasure 5 devices of the prior art can be merged in the invention. With a single laser source, it is possible to achieve both tracking and countermeasures by virtue of the beam strength. The light source is unique and of small dimension. A device according to the invention is very compact, which increases the stealth aspect of the device and of the assembly on which it is mounted.

The invention solves the problem of interference due to the joint use of a coherent light source and of a homing head which includes a double prism that generates different optical paths for the rays of a laser beam that pass through it. The homing head is compatible with laser sources of small coherence length (typically a few centimeters).

The homing head engenders very little loss of laser power.

The homing head is very simple to create and to use. Little or no adjustment is necessary.

It has no dead angle, and in particular allows zenithal sighting. It covers a homing space at least equal to $2\pi$ steradians.

In addition, the mechanical placement of the homing head is symmetrical around its working axes. The center of gravity of the head is therefore located on the working axes. The head can therefore be less sensitive to vibration from a structure on which is it mounted. The head itself does not generate any vibration or destabilization of the sighting line.

Finally, the displacement of the head is very rapid, because of its lower inertia and an appropriate motor drive.

BRIEF DESCRIPTION OF THE DRAWINGS

Other characteristics, aims and advantages of the invention will emerge from the description that follows, which is purely illustrative and not limiting, and which should be read with reference to the appended drawings in which:

FIG. 1, already mentioned, schematically represents a known pyrotechnic countermeasure device;

FIG. 2, already mentioned, represents a device known from the prior art, that allows firstly tracking of, and secondly countermeasures against, a threat in the form of an infrared homing missile;

FIGS. 5C and 5D respectively represent the output apertures in the orientations of the head corresponding to FIGS. 3A and 3B respectively;

FIG. 6 schematically represents a view in section of one possible method of implementation of a homing head according to the invention;

FIG. 7 schematically represents a view in perspective and an exploded view of one method of implementation of a homing head according to the invention; and FIG. 8 schematically represents the mounting of two tracking and countermeasure devices according to the invention on an aircraft 1.

On all of these figures, similar elements carry identical numerical references.

DETAILED DESCRIPTION

Figure 3A:
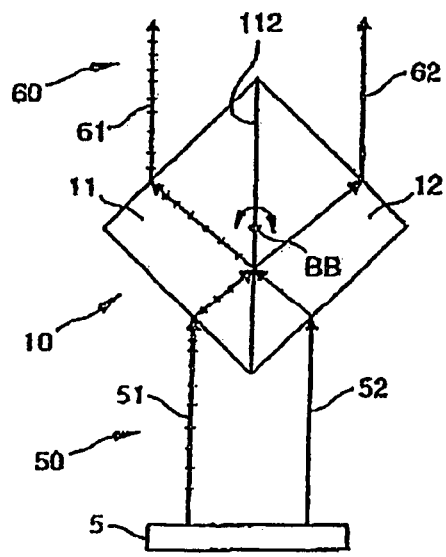
FIGS. 3A and 3B schematically represent the trajectory of optical rays inside a homing head according to the invention.
Figure 3B:
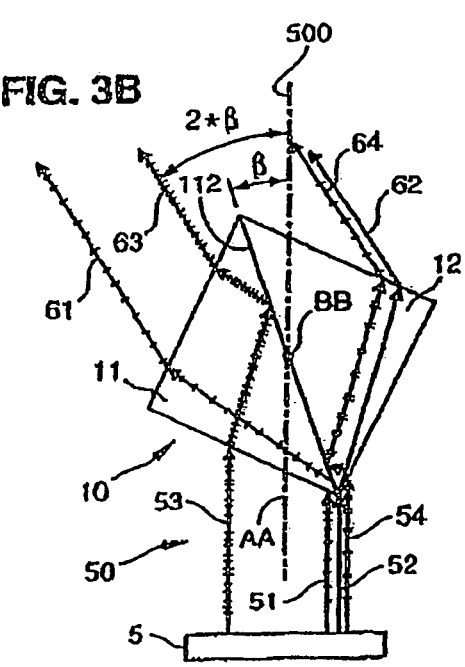

FIGS. 3A and 3B show that an improved threat tracking and countermeasure device according to the invention includes a homing head for an incident laser beam 50 obtained from a laser source 5.

In the remainder of this present description, for reasons of clarity, we present only a single direction of the trajectory of the light rays. According to the reverse light return principle, it can be seen that the rays can move in the reverse direction to that presented, and that the homing head can therefore be used both for tracking and for the countermeasures to the threat.

The laser source 5 is preferably of the infrared laser type. Advantageously, the laser source 5 has a small coherence length (typically of the order of one centimeter).

The homing head is designed to receive incident light beam 50 and to re-direct the latter in order to produce a transmit beam 60.

To this end, the head mainly includes two prisms 11, 12 forming a double prism 10. The prisms 11, 12 are preferably of the rectangle and isosceles type. They are both attached to a face 112 represented by the hypotenuse of their base forming a triangle-rectangle. The double prism 10 therefore forms a cube.

The face 112 separates the double prism 10 into two equal parts and forms a dioptre reflecting the rays of the incident laser beam 50 and then passing into the prisms 11, 12. FIG. 3A shows the trajectory of two incident rays 51, 52 in the double prism 10. It will be observed that the rays 51, 52 are totally reflected by the face 112. The rays 51, 52 are transmitted, and then references as 61, 62 respectively after the double prism 10.

The double prism 10 is mounted to rotate around an axis of rotation BB that is perpendicular to the base of the double prism, meaning perpendicular to the plane of FIGS. 3A and 3B, and passing through the geometric center of the double prism. Axis BB allows the rotation of the double prism 10 in the plane of FIGS. 3A and 3B, and therefore the orientation of beam 60 in elevation.

FIG. 3B shows that a rotation by an angle beta of the double prism around axis BB allows a rotation of the transmitted beam 60 by an angle of 2β. To this end, FIG. 3B shows the trajectory of four rays, with the rays 61, 62, 63 and 64 being the transmitted rays. With a rotation of the double prism 10 by a value of at least 45° on either side of the optical axis 500, the head can cover an angle in elevation of at least 180°.

Figure 4:
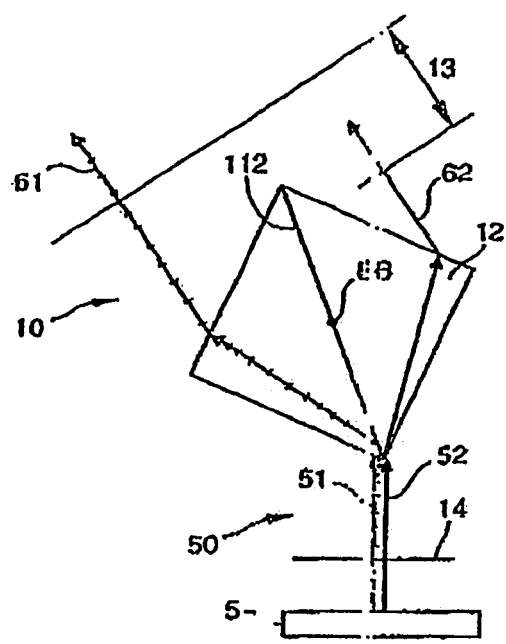
FIG. 4 schematically represents the generation of a path difference between two optical rays passing through a homing head according to the invention.

FIG. 4 shows that the rotation of the double prism 10 around axis BB results in a phase advance due to the optical path difference 13 between the two rays 61, 62 transmitted respectively by the prisms 11, 12. The path difference 13 is measured in relation to the upstream phase reference 14 of the double prism 10 over the incident rays 51, 52.

Figure 5A:
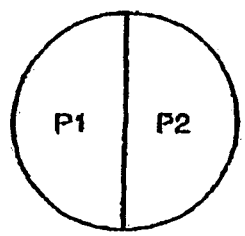
FIGS. 5A and 5B represent the sub-apertures in the orientations of the head corresponding to FIGS. 3A and 3B.
Figure 5B:
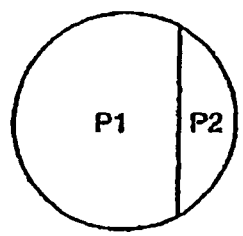

Furthermore, FIGS. 5A to 5D show that the double prism divides the transmit beam 60 into two sub-beams. The countermeasure device output aperture is split into two parts, with one passing via prism 11 (aperture P1), and the other passing via prism 12 (aperture P2). FIGS. 5A and 5C correspond to the situation of FIG. 3A, and FIGS. 5B and 5D correspond to the situation of FIG. 3B. FIGS. 5A and 5B thus show that the two incoming sub-apertures, P1 and P2, vary in particular as a function of the angle of orientation β of the double prism 10. FIGS. 5C and 5D show that each prism has the effect of reversing and offsetting the aperture in a different manner for each angle of incidence leading to a change of direction of outgoing sub-apertures P'1 and P'2.

The path difference 13 results in interference between the rays 61, 62. Such interference is very disadvantageous in relation to threat tracking and countermeasure activity. The dark zones of the interference patterns can in fact result in zones in which there is no detection of the threat and/or to zones in which there is no jamming. In addition, the fact that the path difference varies when using the head, in particular as a function of the angle of orientation of the double prism, again renders threat tracking and countermeasure activity more difficult.

As a consequence, it is necessary to render the two sub-parts of the beam 60 mutually incoherent, so as to eliminate the interference between the rays exiting from the double prism.

In this regard, FIG. 6 shows that the homing head includes a delay device 130 that is used to render the two sub-parts of beam 60 mutually incoherent.

Advantageously, device 130 includes an optical blade 131 in the path of one of the two sub-beams. The optical path delay introduced by the blade 131 is at least greater than the coherence length of the laser source 5 in all the working positions of the double prism.

The delay blade 131 is chosen so as to satisfy several requirements.

Firstly, the thickness of the blade must be sufficient to ensure the incoherence of the two sub-beams at all the working angles of the head. It inserts into a single sub-beam which has an additional optical path that is greater than the sum firstly of the coherence length of the laser source and secondly of the optical path advance between the two apertures. The value of an additional optical path inserted by the blade 131 is greater than the said sum in the worst case of head operation. In this way, the incoherence of the two sub-beams exiting from the homing head is guaranteed, regardless of the angular position of the deflected transmitted beam.

Secondly, the blade must guarantee low optical energy losses due to traversing material in the working spectral band of the laser source. The blade 131 must therefore be relatively thin.

Thirdly, the blade must be anti-reflection treated. The anti-reflection treatment imparts a stealth aspect to the tracking and countermeasure device. It also allows the optical energy losses due to reflection at the walls of the blade at the input to the device to be limited.

Fourthly, the blade must be mounted with a slight incline so as not to generate specular reflection in the incident direction, in order to prevent:
firstly, parasitic reflections of the laser source inside the DIRCM device, which would reduce the effectiveness of tracking and jamming;
secondly, a potential for detection, through the "cat's eye" effect, by generating a non-negligible LES.

Remember that it is preferable that the laser source should have a small coherence length, typically of just a few centimeters.

As a consequence, if L is the thickness of the blade 131 and n is the refractive index of the material from which the blade is made, then it is necessary that:

$$(L \times n - L) \geq Lc \qquad (1)$$

where Lc is the coherence length of the laser source.

If we take materials with a high refractive index, like silicon for example, which has an index of the order of 3.4, then we get:

$$L \geq \frac{L_c}{2,4} \qquad (2)$$

so that L≧8.3 mm for a coherence length of the source 5 equal to 20 mm. It can be seen therefore that the blade is quite small.

Other methods of implementation of the optical delay device 130 are also possible. In particular, these can have mirrors that introduce an optical path difference between the sub-beams. However, these implementation methods are more difficult to implement and are also less compact.

The developments presented above describe the orientation of the head in elevation. In order to be able to cover an angular space of at least 2π steradians, it is necessary to have another axis of rotation of the head.

FIGS. 3 and 6 show that, preferably, an input axis to the system is parallel to the base of the double prism 10. The input axis is coincident with an axis of rotation AA passing through the geometric center of the double prism 10. Axis AA is the axis of orientation in horizontal bearing, and allows the prism to be rotated around the input axis for orientation of the transmitted beam 60 in horizontal bearing. For zenithal sighting, axis AA is parallel to the face 112. The deflection angle (α) of the beam 50 in horizontal bearing is the same as the angle of rotation of the prism α in horizontal bearing around axis AA.

In order to allow rotation around the two axes AA and BB, the double prism is mounted on two supports 19 covering the two faces corresponding to the base of the double prism 10. Each support 19 is mounted to rotate in a yoke 15 with two arms 16. A rotation and elevation drive motor is described later in this present description.

The arms 16 of the yoke 15 include a pivoting link with the supports 19 in order to allow rotation of the double prism 10 around axis BB between the arms of the yoke, as shown in FIGS. 6 and 7. The main axis of the yoke 15 is coincident with axis AA, and is therefore parallel to the base of the double prism 10. A drive motor for rotation in horizontal bearing allows all of this mechanism to be driven around axis AA.

In practice, the position of the blade 131 is controlled as a function of the angular position of the double prism 10 on the two axes AA and BB of rotation of the double prism 10. For example, the blade 131 continuously covers the part of the aperture P1 in front of prism 11. When the double prism 10 rotates in elevation through an angle beta around axis BB, the blade 131 moves, and follows the central edge at the face 112 of the double prism 10. To this end, the support 133 of the blade 131 is displaced in a linear movement CC on a slide 132.

Several methods of implementation of the means for movement of the blade support 131 are possible.

A first method of implementation is such that when the double prism rotates so as to orientate the beam in elevation, the blade support 131 is displaced on its slide 132 by a drive bracket 14.

To this end, the bracket 14 is connected firstly to a support 19 of the double prism by link 141, and secondly to the support 133 of the blade 131 by link 134. Links 141 and 134 are of the pivoting link type. Link 134 is also mobile in translation in the support 133 in order to allow movement in direction CC on slide 132. A mechanical cam system is also possible.

In this method of implementation for movement of the blade 131, the movement of the double prism, transmitted by a drive motor in elevation, located on axis BB or in link 141, is also transmitted to the blade 131 by means of bracket 14. Reciprocally, a movement transmitted to the blade 131 by a motor located close to the blade is transmitted to the double prism 10 by means of bracket 14.

A second method of implementation is such that the orientation of the double prism 10 and the movement of the blade 131 are effected by separate and synchronized motors. Bracket 14 is therefore no longer necessary, thus simplifying the mechanical mounting of the head. The mechanical parts have lower inertia and an appropriate motor drive to allow rapid movement of the double prism and of the blade.

Advantageously, the blade and the movement resources are statically balanced by a static balancing device 135. The static balancing device 135 is placed symmetrically to the blade for example, and its movement resources in relation to axis A-A. The balancing device allows us to avoid angular destabilization of the sighting line during the tracking phases by linear excitation of the beam homing head. We thus eliminate the presence of any possible unbalance.

FIGS. 6 and 7 show that the device includes a cover 17 for protection of the double prism and the rest of the device. The cover 17 is of more-or-less hemispherical shape. It mainly includes a material 18 that is transparent to infrared light emitted or received by tracking and countermeasure device. The material 18 covers a minimum angle of 180° in elevation on the cover 17 along a plane of symmetry of the cover. The cover 17 rotates in horizontal bearing in sympathy with the yoke 15. All of the device is driven around axis AA so as to provide for scanning in the horizontal bearing plane.

The device is designed firstly to effect the tracking of a missile and secondly to take countermeasures against a missile. The tracking phases can be successive or intermittent, according to the applications and the threats involved.

FIG. 8 shows that in order to have full coverage of the space, two devices according to the invention can be mounted on the two opposite sides of an aircraft 1. The devices of the invention are very compact and stealthy. They are mechanically balanced (this is the case in particular of the double prism and the head and blade) which means that they are not very sensitive to the vibration from a motor or the rotors of an aircraft. The head itself does not generate any vibration or any destablization of the sighting line.

It can be seen that the developments described above apply to military aircraft, such as transport craft or attack and transport helicopters. The threats, for example, can be from ground-air missiles or air-air missiles in single combat. The case of multiple threats involving the firing of several missiles in a salvo is also envisioned. The developments described can also apply to civil aircraft, such as long-haul planes for example, against terrorist threats. It can also be seen that the developments described also apply to other types of vehicle, like tanks or trucks, and even to civil or military buildings or vessels threatened by missiles.

The invention claimed is:

1. A device to counter and track a threat in the form of a missile with a homing system, the device including a homing head designed to receive a coherent incident light beam, and to re-direct the latter in order to produce a transmitted beam, wherein the homing head includes a double prism designed to divide the transmitted beam into two sub-beams, with the double prism being associated with an optical delay device designed to insert an optical path difference, between the two sub-beams, that is greater than the coherence length of the incident beam.

2. The device according to claim 1, in which the double prism is mounted to rotate in elevation around an axis perpendicular to its base and passing through its geometric centre.

3. The device according to claim 2, in which the double prism is mounted on a mobile support to rotate around the axis of rotation in elevation in a yoke.

4. The device according to claim 1, in which the head is mounted to rotate in horizontal bearing around an axis parallel to the base of the double prism and passing through the geometric centre of the double prism.

5. The device according to claim 4, in which a cover for protection of the double prism is mounted to rotate in horizontal bearing.

6. The device according to claim 1, in which the delay device includes an optical blade.

7. The device according to claim 6, in which the blade is mounted on a mobile support on a slide, where the device includes movement resources designed to move the support of the blade on the slide as a function of an angular position of the double prism.

8. The device according to claim 7, in which the movement resources include a bracket connected firstly to a link to a support of the double prism and secondly to a link to the support of the blade.

9. The device according to claim 7, in which the movement resources include a drive motor for support of the blade on the slide.

10. The device according to claim 7, including a static device for balancing the blade and the movement resources, so as to avoid angular destabilization of the sighting line during the tracking phases by linear excitation of the beam homing head.

11. The device according to claim 7, in which the blade is inclined on its support.

12. The device according to claim 1, including an infrared laser source with a coherence length of the order of one centimeter.

* * * * *